(12) United States Patent
Challener et al.

(10) Patent No.: US 8,694,797 B2
(45) Date of Patent: Apr. 8, 2014

(54) METHOD FOR PREVENTING MALICIOUS SOFTWARE FROM EXECUTION WITHIN A COMPUTER SYSTEM

(75) Inventors: David C. Challener, Raleigh, NC (US); Mark C. Davis, Durham, NC (US); Peter Hortensius, Raleigh, NC (US); Rod D. Waltermann, Rougemont, NC (US)

(73) Assignee: Lenovo (Sinapore) Pte Ltd, Singapore (SG)

( * ) Notice: Subject to any disclaimer, the term of this patent is extended or adjusted under 35 U.S.C. 154(b) by 1788 days.

(21) Appl. No.: 11/353,893

(22) Filed: Feb. 14, 2006

(65) Prior Publication Data

US 2007/0226711 A1  Sep. 27, 2007

(51) Int. Cl.
*G06F 9/445* (2006.01)
*G06F 11/30* (2006.01)
*G06F 12/14* (2006.01)

(52) U.S. Cl.
USPC ............ 713/190; 713/189; 717/174; 717/175

(58) Field of Classification Search
None
See application file for complete search history.

(56) References Cited

U.S. PATENT DOCUMENTS

| | | | |
|---|---|---|---|
| 4,574,349 A | | 3/1986 | Rechtschaffen |
| 4,951,195 A | | 8/1990 | Fogg, Jr. et al. |
| 5,167,023 A | | 11/1992 | de Nicolas et al. |
| 5,301,302 A | | 4/1994 | Blackard et al. |
| 5,675,645 A | * | 10/1997 | Schwartz et al. ............. 713/187 |
| 5,768,593 A | * | 6/1998 | Walters et al. ................. 717/141 |
| 5,925,123 A | | 7/1999 | Tremblay et al. |
| 6,101,592 A | | 8/2000 | Pechanek et al. |
| 6,154,831 A | | 11/2000 | Thayer et al. |
| 6,219,787 B1 | * | 4/2001 | Brewer ......................... 713/167 |
| 6,321,322 B1 | | 11/2001 | Pechanek et al. |
| 6,381,737 B1 | * | 4/2002 | Click et al. .................... 717/136 |
| 6,397,242 B1 | | 5/2002 | Devine et al. |
| 6,496,847 B1 | | 12/2002 | Bugnion et al. |
| 6,557,094 B2 | | 4/2003 | Pechanek et al. |
| 6,708,272 B1 | | 3/2004 | McCown et al. |

(Continued)

FOREIGN PATENT DOCUMENTS

| | | |
|---|---|---|
| GB | 2 377 795 | 3/2001 |
| JP | 2000-056966 | 2/2000 |
| JP | 2005-085188 | 3/2005 |
| WO | 01 75565 A2 | 10/2001 |

OTHER PUBLICATIONS

A. Faustino da Silva and V. Santos Costa, "An Experimental Evaluation of JAVA JIT Technology", j-jucs, 2005, vol. 11, No. 7, pp. 1291-1309.*

(Continued)

*Primary Examiner* — Lewis A Bullock, Jr.
*Assistant Examiner* — Mark Gooray
(74) *Attorney, Agent, or Firm* — Antony P. Ng; Yudell Isidore Ng Russell PLLC

(57) ABSTRACT

A method for preventing malicious software from execution within a computer system is disclosed. Before any actual execution of an application program on a computer system, the application program needs to be cross-compiled to yield a set of cross-compiled code of the application program. The set of cross-compiled code of the application program can then be executed in an execution module that is capable of recognizing and translating the set of cross-compiled code of the application program to the actual machine code of the processor.

16 Claims, 3 Drawing Sheets

(56) References Cited

U.S. PATENT DOCUMENTS

| | | | |
|---|---|---|---|
| 6,715,142 B1* | 3/2004 | Saito et al. | 717/159 |
| RE40,405 E* | 6/2008 | Schwartz et al. | 713/187 |
| 7,415,618 B2* | 8/2008 | de Jong | 713/190 |
| 7,424,620 B2 | 9/2008 | deJong | |
| 7,739,673 B2* | 6/2010 | Linden | 717/140 |
| 7,779,394 B2* | 8/2010 | Homing et al. | 717/136 |
| 2004/0101142 A1 | 5/2004 | Nasypny | |
| 2004/0230958 A1* | 11/2004 | Alaluf | 717/140 |
| 2005/0071653 A1 | 3/2005 | De Jong | |
| 2005/0108507 A1* | 5/2005 | Chheda et al. | 712/209 |
| 2005/0114610 A1 | 5/2005 | Robinson et al. | |
| 2005/0120160 A1* | 6/2005 | Plouffe et al. | 711/1 |
| 2005/0188171 A1 | 8/2005 | McIntosh | |
| 2006/0236127 A1* | 10/2006 | Kurien et al. | 713/193 |
| 2007/0192620 A1 | 8/2007 | Challener et al. | |

OTHER PUBLICATIONS

Saputra et al, "Code Protection for Resource-Constrained Embedded Devices", 2004, ACM.*

Lane, Gregory—Final Office Action dated Nov. 4, 2010, U.S. Appl. No. 11/353,896.

Lane, Gregory—Non-final Office Action dated May 13, 2009, U.S. Appl. No. 11/353,896.

Lane, Gregory—Non-final Office Action dated Jul. 19, 2010, U.S. Appl. No. 11/353,896.

Lane, Gregory—Advisory Action dated Dec. 28, 2010, U.S. Appl. No. 11/353,896.

Lane, Gregory—Notice of Allowance dated Jul. 19, 2011, U.S. Appl. No. 11/353,896.

* cited by examiner

|   | 0 | 1 | 2 | 3 | 4 |
|---|---|---|---|---|---|
|   |   |   |   |   | 1 |

FIG. 3a

|   | 0 | 1 | 2 | 3 |   |
|---|---|---|---|---|---|
| 2 |   |   |   |   | 1 |

FIG. 3b

|   |   | 0 | 1 | 2 |   |
|---|---|---|---|---|---|
| 2 |   |   |   | 3 | 1 |

FIG. 3c

|   |   | 0 | 1 |   |   |
|---|---|---|---|---|---|
| 2 |   | 4 | 3 | 1 |   |

FIG. 3d

| 2 | 5 | 4 | 3 | 1 |
|---|---|---|---|---|

FIG. 3e

METHOD FOR PREVENTING MALICIOUS SOFTWARE FROM EXECUTION WITHIN A COMPUTER SYSTEM

RELATED PATENT APPLICATION

The present patent application is related to a copending application U.S. Ser. No. 11/353,896, filed on even date.

BACKGROUND OF THE INVENTION

1. Technical Field

The present invention relates to avoiding malicious software in general, and, in particular, to a method for preventing malicious software from execution within a computer system.

2. Description of Related Art

Malicious software, such as computer viruses, can enter a computer system in many ways. For example, they can enter a computer system via a disk that is to be inserted into the computer system or they can enter the computer system via an email that is to be opened by a user of the computer system. Malicious software can cause problems to the computer system if they are executed within the computer system. For example, computer security may be compromised or files within the computer system may be destroyed.

Certain types of malicious software can easily be detected using simple detection techniques, such as scanning for a search string. However, this type of detection process can also easily be subverted by converting malicious code via compression or encryption, thus bypassing scanning filters. Another approach to detecting malicious software is to run a program while attempting to intercept malicious actions during program execution. This technique, which is known as behavior blocking, has a number of disadvantages. Despite of the attempt to intercept malicious actions, the program may nevertheless cause harm to the computer system. Furthermore, the behavior blocking mechanism typically cannot view an entire log of actions in making a blocking determination. Hence, the behavior blocking mechanism may make sub-optimal blocking decisions, which means harmless programs may be blocked while harmful programs may be allowed to execute.

Yet another approach to detecting malicious software is to emulate suspect code within an insulated environment of a computer system so that the computer system is protected from malicious actions of the suspect code. One drawback of emulation is that while it may protect parts of the computer system from virus attacks, it is not itself protected. Additionally, data can be infected, which leads to a break in the isolation environment.

Consequently, it would be desirable to provide an improved method for preventing malicious software from execution within a computer system.

SUMMARY OF THE INVENTION

In accordance with a preferred embodiment of the present invention, before any actual execution of an application program on a computer system, the application program needs to be cross-compiled to yield a set of cross-compiled code of the application program. The set of cross-compiled code of the application program can then be executed in an execution module that is capable of recognizing and translating the set of cross-compiled code of the application program to the actual machine code of the processor.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3*a*-3*e* depict a sequence in which instructions is being permuted, in accordance with a preferred embodiment of the present invention.

DETAILED DESCRIPTION OF A PREFERRED EMBODIMENT

Typically, there are several levels of instruction sets within a computer system. The first (lowest) level is the machine level instructions, and the second level is the operating system application binary interface instructions. At the second level, the operating system has abstracted some of the machine level instructions to make them easier to be understood. The third level is the macro level instructions, at which an application has further abstracted control of the computer system to allow for ease of programming.

Since many techniques have been dedicated to the protection of the second and third levels of instructions, the present invention is solely directed to the protection of the first level of instruction, especially when this is the level that is used by many computer viruses.

Generally speaking, it is improbable, if not impossible, to write a machine level program that can be executed within a computer system without knowing the machine level instruction set of a processor within the computer system. In addition, an installation of software on a computer system requires the software to first understand the instruction set of the computer system on which it is being installed. Thus, in accordance with a preferred embodiment of the present invention, an application program is initially transformed to a set of cross-compiled code of the application program, and the set of cross-compiled code of the application program is then executed within an execution module that is capable of recognizing the set of cross-compiled code of the application program.

Figure 1:
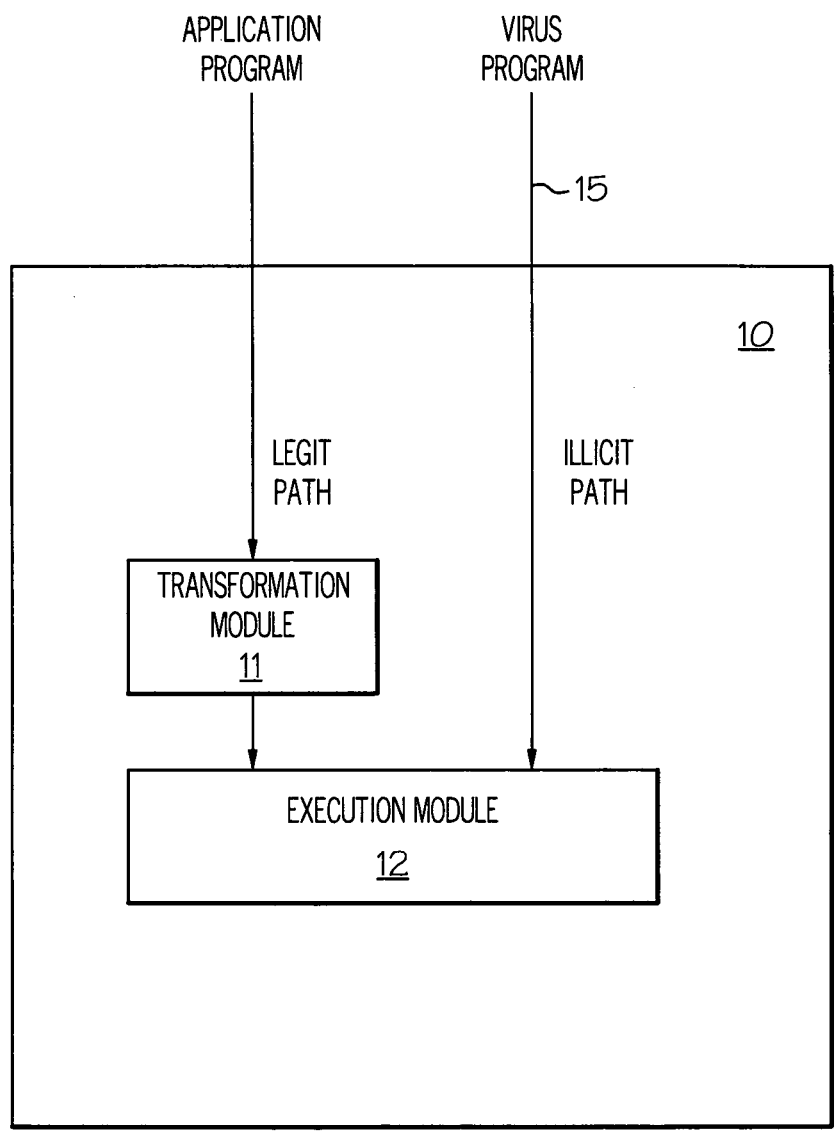
FIG. 1 is a conceptual view of a method for preventing malicious software from execution within a computer system, in accordance with a preferred embodiment of the present invention.

Referring now to the drawings and in particular to FIG. 1, there is depicted is a conceptual view of a method for preventing malicious software from execution within a computer system, in accordance with a preferred embodiment of the present invention. As shown, a computer system 10 includes a transformation module 11 and an execution module 12. Any application program that is to be executed within computer system 10 needs to undergo an installation process. During the installation process, a user of computer system 10 can decide whether or not an application program should be installed within computer system 10. If the user decide the application program should be installed within computer system 10, the application program is then sent to transformation module 11 in which the application program will be transformed to a set of cross-compiled code of the application program. The set of cross-compiled code of the application program can subsequently be executed within execution module 12 that is capable of recognizing and translating the set of cross-compiled code of the application program to the actual machine code of the processor.

Without going through the installation process, an application program will not be able to be executed by execution module 12. For example, as shown in an illicit path 15, even if a virus program has sneaked under the detection of a user and was placed within computer system 10 without the user's knowledge, the virus program still cannot be executed by execution module 12 because the virus program has not undergone the installation process. As such, computer system 10 is safe from the potential harm that could have been brought on by the virus program.

In practice, transformation module 11 and execution module 12 should be isolated from each other. In fact, execution module 12 should be prevented from accepting code from any source other than transformation module 11.

Figure 2:
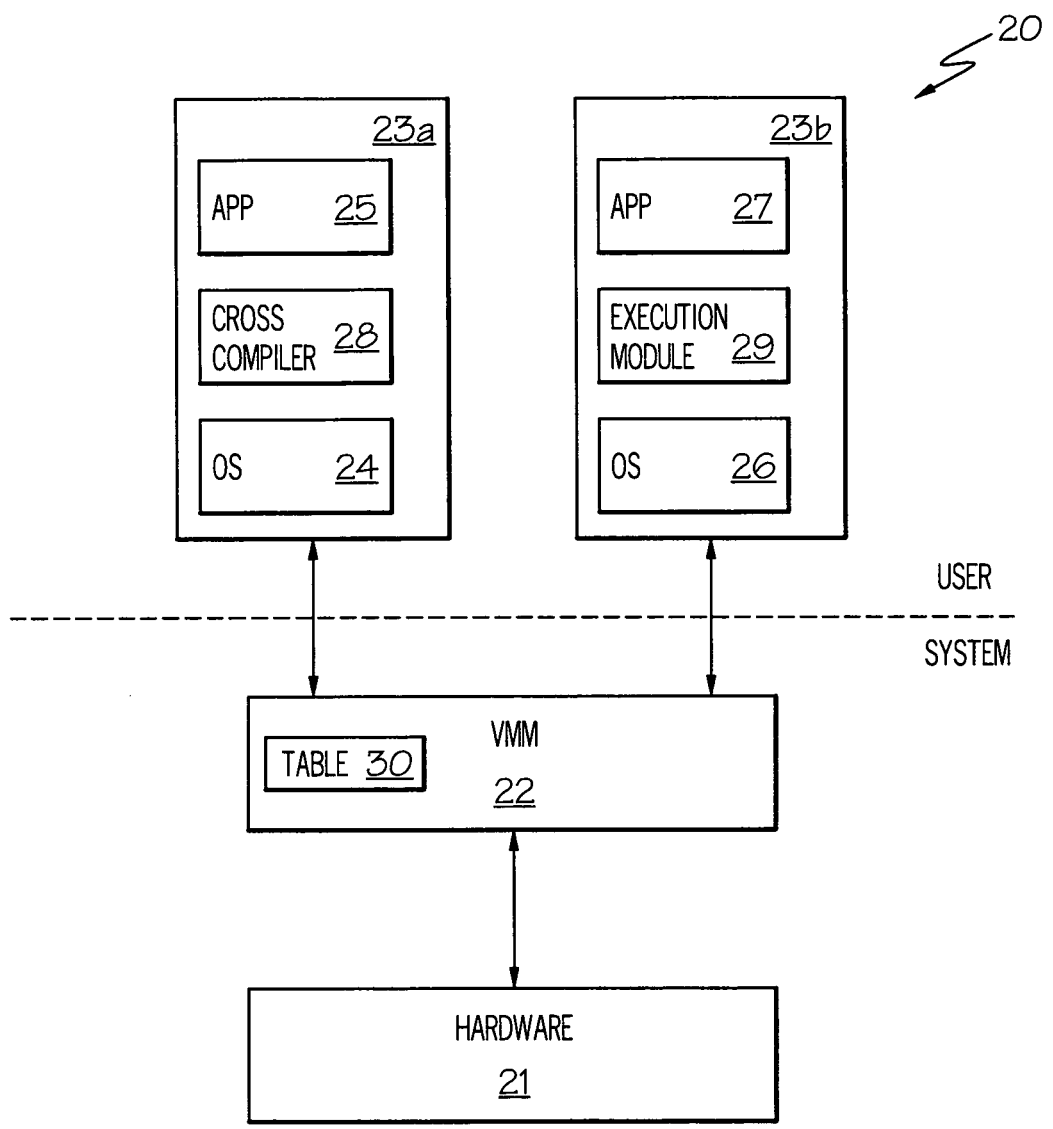
FIG. 2 is a block diagram of a computing environment in which a preferred embodiment of the present invention is incorporated.

With reference now to FIG. 2, there is depicted a block diagram of a computing environment in which a preferred embodiment of the present invention is incorporated. As shown, a computer system 20 includes a hardware structure 21, a virtual machine manager (VMM) or hypervisor 22 and virtual machines 23a-23b. Virtual machines 23a and 23b are preferably located in separate partitions such that any execution within virtual machine 23a is isolated from virtual machine 23b, or vice versa. VMM 22 controls all communications between virtual machines 23a and 23b. In addition, VMM 22 can directly communicate with hardware structure 21. Hardware structure 21 includes such known structures as processors, registers, memory management units, memory devices, input/output devices, etc.

An operating system and multiple application programs can be executed concurrently within each of virtual machines 23a-23b. For example, an operating system 24 and an application program 25 are executed within virtual machine 23a, while an operating system 26 and an application program 27 are executed within virtual machine 23b.

Although it is not required, operating system 24 can be different from operating system 26. For example, operating system 24 can be an open source Linux operating system, while operating system 25 can be Windows® operating system manufactured by the Microsoft Corporation. Similarly, the underlying processor emulated by virtual machine 23a can also be different from the underlying processor emulated by virtual machine 23b. For example, the underlying processor emulated by virtual machine 23a can be a Pentium® processor manufactured by the Intel Corporation, while the underlying processor emulated by virtual machine 23b can be a PowerPC® processor manufactured by the International Business Machines Corporation.

Each of virtual machines 23a-23b, which includes its operating system and associated application programs, operates at a user-level. When VMM 22 uses direct execution, VMM 22 is set to a so-called user-mode (i.e., with reduced privileges) so that none of virtual machines 23a-23b can directly access the various privileged registers that control the operation of hardware structure 21. Rather, all privileged instructions will be trapped into VMM 22.

In FIG. 2, virtual machine 23a is shown to include a cross compiler 28 for performing initial cross-compilations of application programs. In addition, virtual machine 23b is shown to include an execution module 29 for executing the cross-compiled code of the application programs. The cross-compilations are preferably performed via a permutation algorithm, and the results are stored in a permuted instruction pointer table 30. Permuted instruction pointer table 30 includes multiple entries of permutation sequences. Each of the permutation sequences is associated with a set of cross-compiled code of an application program. All the permutation sequences within permuted instruction pointer table 30 are likely to be different from each other, although they are not required to be different from each other. In FIG. 2, permuted instruction pointer table 30 is shown to be placed within VMM 22; however, permuted instruction pointer table 30 can also be placed within virtual machine 23a provided that it can also be accessed by virtual machine 23b.

An exemplary method for performing permutations is as follows. First, a subset of instructions n is selected from a group of instructions for the purpose of permutation. Not all instruction permutations would be equally useful. For example, permutations of identity instructions would be of no use at all. So certain machine instructions (such as a JUMP instruction) should be identified as critical instructions in order to ensure all critical instructions will get permuted.

There are several ways to generate permutations. One method is to utilize a hash or encryption based function such that each instruction in a data segment has a different mapping, i.e., $H(A_1), H(A_2), \ldots, H(A_i)$, where H is the hash based function, and A is an instruction. The problem with using a hash or encryption based function is that, from a general compilation standpoint, same instructions may have different hashed results. For example, instruction $A_5$ and instruction $A_9$ may be the same instruction, but $H(A_5)$ does not necessarily equal to $H(A_9)$.

Another method is to utilize a different mapping function P(A), where P is the permutation, and A is an instruction, which generates: $P_1(A), P_2(A), \ldots, P_n(A)$. This method yields a more predictable cross-compilation result, since $P_1(J)$, where J is the given instruction, should be the same no matter where it appears in code segments.

A permutation sequence dictates the way the subset of instructions n is to be permuted or transformed. Each permutation sequence can be viewed as an entry having multiple slots, and each slot is to be filled with an instruction number. In order to generate an $r^{th}$ permutation sequence, a random number between 0 and n!−1 is initially chosen. For example, if the subset of instructions n needed to be permuted is 5 (which means there are 5!=120 permutation sequences), a random number 101 can be chosen between 0 and 5!−1 as the $101^{th}$ permutation sequence.

The slot position Pos of the first instruction number is indicated by the dividend of the chosen random number r divided by (n−1)!, as follows:

$$Pos = \frac{r}{(n-1)!}$$

The remainder of the division replaces the chosen random number r for the determination of the slot position Pos of the subsequent instruction number until all the slots are filled with instruction numbers. For each determination, n in the denominator (n−1)! is decremented by one.

Thus, for the chosen random number 101, the slot position of the first instruction number is 101/(5−1)!=4, as shown in FIG. 3a. The remainder of 101(5−1)! is 5, and the slot position of the second instruction number is 5/(4−1)!=0, as shown in FIG. 3b. The remainder of 5/(4−1)! is 5, and the slot position of the third instruction number is 5/(3−1)!=2, as shown in FIG. 3c. The remainder of 5/(3−1)! is 1, and the slot position of the fourth instruction number is $1/(2-1)!=1$, as shown in FIG. 3d. The fifth instruction number goes to the remaining open slot position, as depicted in FIG. 3e.

The permutation sequence "25431" (from FIG. 3e) is then entered into permuted instruction pointer table 30 (from FIG. 2) as an entry for the $101^{th}$ permutation sequence. An application program can be permuted according to the $101^{th}$ permutation sequence into a set of cross-compiled code via cross compiler 28 (from FIG. 2). During execution, the set of cross-compiled code can be executed via execution module 29 (from FIG. 2) according to the $101^{th}$ permutation sequence stored in permuted instruction pointer table 30.

For example, if the five instructions chosen to be permuted are ADD, SUBTRACT, JUMP, BRANCH and STORE, then each of these instructions is assigned an instruction number accordingly, i.e., instruction number 1=ADD, instruction number 2=SUBTRACT, instruction number 3=JUMP, instruction number 4=BRANCH and instruction number 5=STORE. When the $101^{th}$ permutation sequence is utilized for performing cross-compilation of an application program within cross compiler 28 of FIG. 2, each occurrence of the above-mentioned five instructions within the application program will be transformed according to the permutation sequence "25431." In other words, each ADD instruction within the application program will be transformed into a SUBTRACT instruction, each SUBTRACT instruction within the application program will be transformed into a STORE instruction, each JUMP instruction within the application program will be transformed into a BRANCH instruction, each BRANCH instruction within the application program will be transformed into a JUMP instruction, and each STORE instruction within the application program will be transformed into an ADD instruction. A reversal of the above-mentioned transformation is performed within execution module 29 of FIG. 2 during the execution of the cross-compiled code of the application program.

The permutation can be performed in either a static or a dynamic manner. If the permutation is performed in a static manner, then a group of computer systems can be set to use the same permutation sequence. Such practice would be easier for an information technology manager because cross compilation of each application program would be required to be performed only once during installation.

If the permutation is performed in a dynamic manner, there are several choices. A set of permutation sequences can be changed periodically. Cross compilation for those permutations can be performed once, and then each time a computer system boots, it can run a different set of cross compiled programs, based on the permutation sequence actually in use. Further, the permutation sequence can randomly change each time the computer system boots. In such a case, cross compilation would have to be done "on the fly" by a cross compiler running on the computer system.

In addition, the permutation sequence can also be changed for each application program, and it can be accomplished by different methods. The simplest implementation is to have the VMM use the signature hash of an application as a key for a streaming encryption algorithm, thereby generating a unique instruction set for that application program. Any altered application program (such as being altered in a main memory due to a virus that causes a buffer overflow) will start generating a different instruction set.

Alternatively, the VMM can generate a random number each time an application program is being loaded, and the code segments of the application program are run through an streaming encryption, or hash (since it does not need to be reversible) engine to change the cross compilation. This method provides an additional level of security in that the $P_n(A)$ function becomes $P(A)$ a constant function and remains unpredictable.

As has been described, the present invention provides a method for preventing malicious software from execution within a computer system. If the VMM keeps a permutation associated with the hash of each permuted application that is to be run, then even a sampling attack (where a sample permuted application is somehow obtained by an attacker, and the permutation determined, applied to a virus, and then sent to perform an infection) fails.

It is also important to note that although the present invention has been described in the context of a fully functional computer system, those skilled in the art will appreciate that the mechanisms of the present invention are capable of being distributed as a program product in recordable type media such as compact discs.

While the invention has been particularly shown and described with reference to a preferred embodiment, it will be understood by those skilled in the art that various changes in form and detail may be made therein without departing from the spirit and scope of the invention.

What is claimed is:

1. A method for preventing malicious software from execution within a computer system, said method comprising:
   providing said computer system a permuted instruction pointer table having a plurality of randomly generated permutation sequences, wherein each of said plurality of permutation sequences is generated by utilizing a subset of N instructions selected within an instruction set;
   in response to a request to install an application program within said computer system, replacing each occurrence of said N subset of instructions within a set of executable code of said application program to another one of said N subset of instructions based on one of said plurality of permutation sequences to yield a set of permuted executable code of said application program before any actual execution of said application program on said computer system, wherein said permutation sequence associates each selected instruction 1 through N to a respective slot 1 through N and stores within said each slots, a respective identifier to a different one of said Nth instruction that will be used to replace each occurrence of said selected instruction within said executable code block with said Nth instruction identified from that respective slot; and
   in response to a request to execute said application program within said computer system, transforming said set of permuted executable code of said application program back to said set of executable code of said application program based on said one permutation sequence, and executing said set of executable code in an execution module within said computer system by translating said set of executable code of said application program to an actual machine code of a processor within said computer system, such that any application program that has not been permuted via said permuted instruction pointer table is not able to be executed within said computer system.

2. The method of claim 1, wherein said method further includes assigning each of said subset of instructions a unique instruction number.

3. The method of claim 2, wherein said permutation sequence includes a sequence of said unique instruction numbers.

4. The method of claim 1, wherein said permutation sequence is stored in a permuted instruction pointer table within said computer system.

5. The method of claim 1, wherein said method further includes
  providing a first virtual machine to perform said cross-compiling; and
  providing a second virtual machine to perform said transforming and executing.

6. The method of claim 5, wherein said first virtual machine includes a first operating system and said second virtual machine includes a second operating system.

7. A non-transitory computer usable device having a computer program product for preventing malicious software from execution within a computer system, said computer usable device comprising:
  program code for providing said computer system a permuted instruction pointer table having a plurality of randomly generated permutation sequences, wherein each of said plurality of permutation sequences is generated by utilizing a subset of N instructions selected within an instruction set;
  program code for, in response to a request to install an application program within said computer system, replacing each occurrence of said N subset of instructions within a set of executable code of said application program to another one of said N subset of instructions based on one of said plurality of permutation sequences to yield a set of permuted executable code of said application program before any actual execution of said application program on said computer system, wherein said permutation sequence associates each selected instruction 1 through N to a respective slot 1 through N and stores within said each slots, a respective identifier to a different one of said Nth instruction that will be used to replace each occurrence of said selected instruction within said executable code block with said Nth instruction identified from that respective slot; and
  program code for, in response to a request to execute said application program within said computer system, transforming said set of permuted executable code of said application program back to said set of executable code of said application program based on said one permutation sequence, and executing said set of executable code in an execution module within said computer system by translating said set of executable code of said application program to an actual machine code of a processor within said computer system, such that any application program that has not been permuted via said permuted instruction pointer table is not able to be executed within said computer system.

8. The computer usable device of claim 7, wherein said computer usable medium further includes program code for assigning each of said subset of instructions a unique instruction number.

9. The computer usable device of claim 8, wherein said permutation sequence further includes a sequence of said unique instruction numbers.

10. The computer usable device of claim 7, wherein said permutation sequence is stored in a permuted instruction pointer table within said computer system.

11. The computer usable device of claim 7, wherein said computer usable medium further includes
  program code for providing a first virtual machine to perform said cross-compiling; and
  program code for providing a second virtual machine to perform said transforming and executing.

12. The computer usable device of claim 11, wherein said first virtual machine includes a first operating system and said second virtual machine includes a second operating system.

13. A computer system capable of preventing malicious software from being executed, said computer system comprising:
  a processor; and
  a system memory coupled to said processor, wherein said system memory contains:
    a permuted instruction pointer table having a plurality of randomly generated permutation sequences, wherein each of said plurality of permutation sequences is generated by utilizing a subset of N instructions selected within an instruction set;
    a cross compiler for, in response to a request to install an application program within said computer system, replacing each occurrence of said N subset of instructions within a set of executable code of said application program to another one of said N subset of instructions based on one of said plurality of permutation sequences to yield a set of permuted executable code of said application program before any actual execution of said application program on said computer system, wherein said permutation sequence associates each selected instruction 1 through N to a respective slot 1 through N and stores within said each slots, a respective identifier to a different one of said Nth instruction that will be used to replace each occurrence of said selected instruction within said executable code block with said Nth instruction identified from that respective slot; and
    an execution module, in response to a request to execute said application program within said computer system, for transforming said set of permuted executable code of said application program back to said set of executable code of said application program based on said one permutation sequence, and executing said set of executable code in said execution module within said computer system by translating said set of executable code of said application program to an actual machine code of a processor within said computer system, such that any application program that has not been permuted via said permuted instruction point table is not able to be executed within said computer system.

14. The computer system of claim 13, wherein each of said subset of instructions is assigned a unique instruction number.

15. The computer system of claim 14, wherein said permutation sequence includes a sequence of said unique instruction numbers.

16. The computer system of claim 15, wherein said permutation sequence is stored in a permuted instruction pointer table.

* * * * *